United States Patent
Sydney et al.

(10) Patent No.: US 12,556,474 B2
(45) Date of Patent: Feb. 17, 2026

(54) SOFTWARE-DEFINED NETWORKING (SDN) CONTROLLER USING ARTIFICIAL INTELLIGENCE (AI)-DRIVEN WEIGHTED-COST MULTI-PATH (WCMP) TO IDENTIFY PATHS FOR DATA CENTERS

(71) Applicant: INTERNATIONAL BUSINESS MACHINES CORPORATION, Armonk, NY (US)

(72) Inventors: Ali Sydney, Pepperell, MA (US); Bengi Karacali-Akyamac, Bridgewater, NJ (US); MD Abdul Alim, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 18/732,017

(22) Filed: Jun. 3, 2024

(65) Prior Publication Data
US 2025/0373546 A1    Dec. 4, 2025

(51) Int. Cl.
*H04L 45/00* (2022.01)
*H04L 45/24* (2022.01)
*H04L 47/30* (2022.01)

(52) U.S. Cl.
CPC .............. *H04L 45/54* (2013.01); *H04L 45/24* (2013.01); *H04L 47/30* (2013.01)

(58) Field of Classification Search
CPC .......... H04L 45/24; H04L 45/54; H04L 47/30
See application file for complete search history.

(56) References Cited

U.S. PATENT DOCUMENTS

| | | | |
|---|---|---|---|
| 8,787,400 B1 | 7/2014 | Barth | |
| 8,982,700 B1* | 3/2015 | Zhou | H04L 45/125 370/235 |
| 9,071,541 B2* | 6/2015 | Atlas | H04L 45/24 |
| 9,178,943 B2* | 11/2015 | DeCusatis | H04L 67/1097 |
| 9,461,915 B1* | 10/2016 | Zhou | H04L 47/125 |
| 9,479,437 B1 | 10/2016 | Zhou | |
| 9,502,111 B2* | 11/2016 | Dharmapurikar | H04L 47/125 |
| 9,559,985 B1* | 1/2017 | Ye | H04L 49/1515 |
| 9,565,114 B1* | 2/2017 | Kabbani | H04L 47/125 |

(Continued)

OTHER PUBLICATIONS

C. Hopps, "Analysis of an Equal-Cost Multi-Path Algorithm," Network Working Group, RFC 2992, Nov. 2000, 8 pp.

(Continued)

*Primary Examiner* — G. C. Neurauter, Jr.
(74) *Attorney, Agent, or Firm* — Konrad, Raynes, Davda & Victor, LLP; Janaki K. Davda

(57) ABSTRACT

Provided are techniques for using AI-driven WCMP to identify paths for data centers. Observations and rewards are used to generate a Weight Certainty Indicator (WCI) value and a Weight Sensitivity Response (WSR) value. For each disjointed path in a plurality of disjointed paths in a network topology, a distance from an overall minimum available capacity for that disjointed path is determined, the distance is normalized, and a weight for that disjointed path is determined using the normalized distance, the WCI value, the WSR value. The weight for each disjointed path of the plurality of disjointed paths is sent to each switch for use in selecting a next switch on a path to a destination.

20 Claims, 17 Drawing Sheets

(56) References Cited

U.S. PATENT DOCUMENTS

| | | | | |
|---|---|---|---|---|
| 9,608,913 | B1* | 3/2017 | Kabbani | H04L 47/125 |
| 9,654,401 | B2* | 5/2017 | Wu | H04L 45/24 |
| 9,736,067 | B2* | 8/2017 | Ye | H04L 45/123 |
| 10,084,687 | B1* | 9/2018 | Sharif | H04L 45/24 |
| 10,320,691 | B1 | 6/2019 | Matthews | |
| 10,904,367 | B2* | 1/2021 | Goel | H04L 12/4633 |
| 12,212,495 | B2* | 1/2025 | Vegesna | H04L 12/4633 |
| 12,231,353 | B2* | 2/2025 | Goel | H04L 69/40 |
| 12,278,763 | B2* | 4/2025 | Vegesna | H04L 47/12 |
| 12,294,470 | B2* | 5/2025 | Ruan | H04L 45/24 |
| 12,341,687 | B2* | 6/2025 | Vegesna | H04L 45/24 |
| 2014/0181298 | A1* | 6/2014 | Wang | H04L 43/04 |
| | | | | 709/224 |
| 2023/0261973 | A1* | 8/2023 | Jennings | H04L 49/506 |
| | | | | 370/389 |

OTHER PUBLICATIONS

C. Tessler, et al., "Reinforcement Learning for Datacenter Congestion Control," arXiv:2102.09337v1, Feb. 18, 2021, 14 pp. (Also ACM Sigmetrics Performance Evaluation Review, 2022).

D. Thaler, et al., "Multipath Issues in Unicast and Multicast Next-Hop Selection," Network Working Group, RFC 2991, Nov. 2000, 9 pp.

I. Nascimento, et al., "Deep Reinforcement Learning Applied to Congestion Control in Fronthaul Networks," IEEE Latin-American Conference on Communications, 2019, 6 pp.

J. Lim, et al., "Reinforcement learning based load balancing for data center networks," 2021 IEEE 7th International Conference on Network Softwarization, 2020, 5 pp.

J. Zhou, et al., "WCMP: Weighted Cost Multipathing for Improved Fairness in Data Centers," EuroSys: Proceedings of the Ninth European Conference on Computer Systems, 2014, 13 pp.

L. Jiang, et al., "A Multipath Transmission System for Information-Centric Networking Based on Standalone Name Resolution," Applied Sciences 13, No. 7 (2023): 4195, 21 pp.

K. Winstein, et al., "TCP ex Machina: Computer-Generated Congestion Control," ACM, Sigcomm '13 Computer Communication Review, Aug. 2013, 12 pp.

M. Dong, et al., "PCC: Re-architecting Congestion Control for Consistent High Performance," Usenix, Symposium on Networked Systems Design and Implementation, May 2015, 15 pp.

M. Dong, et al., "PCC Vivace: Online-Learning Congestion Control," Usenix Symposium on Networked Systems Design and Implementation, Apr. 2018, 15 pp.

N. Jay, et al, "A Deep Reinforcement Learning Perspective on Internet Congestion Control, Proceedings of the 36th International Conference on Machine Learning," 2019, 10 pp.

N. Rikhtegar, et a., "DeepRLB: A deep reinforcement learning-based load balancing in data center networks," International Journal of Communication Systems, Wiley, Research Article, Jun. 2021, 23 pp.

W. Li et al., QTCP: Adaptive Congestion Control with Reinforcement Learning, IEEE Transactions on Network Science and Engineering, 2019, 13 pp.

Y. Chen, et al., "RL-Routing: An SDN Routing Algorithm Based on Deep Reinforcement Learning," IEEE Transactions on Network Science and Engineering, 2020, 15 pp.

Y. Kong, et al., "Improving TCP Congestion Control with Machine Intelligence," ACM Sigcomm 2018 Workshop on Network Meets AI & ML, 2018, 7 pp.

Y. Wang, et al., "An intelligent TCP congestion control method based on Deep Q Network," Future Internet, 2021, 14 pp.

* cited by examiner

300

The following weight function is used to generate a weight:

$$weight = \left(\frac{\delta}{\eta}\right)^{1/\sigma} \mu + 1$$

Where:
- $\delta$ : percentage distance from the minimum available capacity
- $\eta$ : $\delta$ normalizer
- $\sigma$ : Weight Sensitivity Response (WSR)
- $\mu$ : Weight Certainty Indicator (WCI)

FIG. 3

┌─────────────────────────────────────────────┐
│  ╭─ 1200                                    │
│  The following equations are used to generate a reward R: │
│                                             │
│  $U_r = \mu^3$                              │
│                                             │
│  $Q_d = (1 - \max(Q, 0.1))^{1/\max(U, 0.1)}$ │
│                                             │
│  $R = Q_d * U_r$                            │
│                                             │
│  Where:                                     │
│    • $U$ : Port Utilization                 │
│    • $U_r$ : Port Utilization reward        │
│    • $Q$ : Queue occupancy                  │
│    • $Q_d$ : Queue occupancy discount       │
│    • $R$ : Reward                           │
└─────────────────────────────────────────────┘

FIG. 12A

SOFTWARE-DEFINED NETWORKING (SDN) CONTROLLER USING ARTIFICIAL INTELLIGENCE (AI)-DRIVEN WEIGHTED-COST MULTI-PATH (WCMP) TO IDENTIFY PATHS FOR DATA CENTERS

BACKGROUND

Embodiments of the invention relate to an SDN controller using AI-driven Weighted-Cost Multi-Path (WCMP) to identify paths for data centers.

Data centers include multiple servers and exhibit multiple paths between these servers. A switch on a path between a source server and a destination server determines how to select the next hop switch among several alternative links. Historically, Equal-Cost Multi-Path (ECMP) has been an approach to select this next hop switch. ECMP is deployed in hardware which boosts efficiency.

ECMP leverages the concept of a data flow ("flow"), which is a stream of packets with similar header information including: the protocol, source and destination IP addresses, and source and destination port numbers. When a data flow enters a switch, ECMP hashes the data flow uniformly across the available egress ports towards the destination server using packet header fields. This implies that given a switch with two egress ports on the path towards the destination server, there is a 50% probably of selecting either port. Although there may be available capacity on one link, ECMP hashes the data flow across the two links. As a result, data flows may traverse the same egress port resulting in poor utilization and performance for workloads. Hashing or selecting the same port to transmit multiple data flows is the well-known phenomenon called hash collisions, and this is one of the susceptibilities of ECMP.

Hash collisions may degrade network performance. Furthermore, these hash collisions may be exacerbated by the existence of large/elephant data flows. In addition, data centers today are gravitating towards support of a large user-base, workloads such as Artificial Intelligence processing that require large datasets, and applications that require low latency and high throughput. To meet these demands, data centers are deploying protocols such as Remote Direct Memory Access (RDMA) over Converged Ethernet (RoCE), which supports data flows that may run at line rate of the Network Interface Card (NIC). Therefore, an ECMP-enabled fabric that supports RoCE data flows may be detrimental to network performance when hash collisions occur.

To date, researchers have proposed static and dynamic versions of Weighted-Cost Multi-Path (WCMP) as alternatives to ECMP.

From a static WCMP perspective, operators assign fixed weights to links based on link capacity, and distribute data flows based on the weights. This implies that more data flows will traverse links with more capacity. For static WCMP, the network measurement is link capacity; the measurements are consumed by a mathematical model to obtain weights; and, since these weights change in case of a link or switch failure, there is no need to account for delays between obtaining the network measurement and injecting weights at switches. Though an improvement to ECMP, this WCMP approach is tailored to a specific fabric configuration.

From a dynamic WCMP perspective, operators leverage Reinforcement Learning (RL) to learn the link weights that improve network performance. For dynamic WCMP, there is no network measurement to obtain weights, no mathematical model to consume the weights, and no consideration of uncertainty between network measurement retrieval and injection of weights in the network. Thus, this RL approach is not scalable and is susceptible to the core challenge of conventional RL techniques of exploring a distribution of all possible actions while attempting to solve complex problems. In the real-world, this RL approach requires expensive computing resources, resulting in training times of the RL that may extend to months, and even subsequently does not maximize the expected utility.

This dynamic WCMP approach builds on existing RL research that addresses network congestion. In particular, RL has been used to address problems such as adaptive routing, weighted shortest path routing, and congestion control with Transmission Control Protocol (TCP). In all these approaches, the workflow is similar: observe network features such as delay, rate, and loss; take actions that increase throughput and decrease latency; encourage the agent to take actions that maximize throughput and minimize latency.

SUMMARY

In accordance with certain embodiments, a computer program product comprising a computer readable storage medium having program code embodied therewith is provided, where the program code is executable by at least one computer processor to perform operations for using AI-driven WCMP to identify paths for data centers. In accordance with yet other embodiments, a computer-implemented method comprising operations is provided for using AI-driven WCMP to identify paths for data centers. In such embodiments, observations and rewards are used to generate a Weight Certainty Indicator (WCI) value and a Weight Sensitivity Response (WSR) value. For each disjointed path in a plurality of disjointed paths in a network topology, a distance from an overall minimum available capacity for that disjointed path is determined, the distance is normalized, and a weight for that disjointed path is determined using the normalized distance, the WCI value, the WSR value. The weight for each disjointed path of the plurality of disjointed paths is sent to each switch for use in selecting a next switch on a path to a destination.

In accordance with other embodiments, a computer system comprises one or more computer processors, one or more computer-readable memories and one or more computer-readable, tangible storage devices; and program instructions, stored on at least one of the one or more computer-readable, tangible storage devices for execution by at least one of the one or more computer processors via at least one of the one or more memories, to perform operations for using AI-driven WCMP to identify paths for data centers. In accordance with yet other embodiments, a computer-implemented method comprising operations is provided for using AI-driven WCMP to identify paths for data centers. In such embodiments, observations and rewards are used to generate a Weight Certainty Indicator (WCI) value and a Weight Sensitivity Response (WSR) value. For each disjointed path in a plurality of disjointed paths in a network topology, a distance from an overall minimum available capacity for that disjointed path is determined, the distance is normalized, and a weight for that disjointed path is determined using the normalized distance, the WCI value, the WSR value. The weight for each disjointed path of the plurality of disjointed paths is sent to each switch for use in selecting a next switch on a path to a destination.

In accordance with yet other embodiments, a computer-implemented method comprising operations is provided for using AI-driven WCMP to identify paths for data centers. In such embodiments, observations and rewards are used to generate a Weight Certainty Indicator (WCI) value and a Weight Sensitivity Response (WSR) value. For each disjointed path in a plurality of disjointed paths in a network topology, a distance from an overall minimum available capacity for that disjointed path is determined, the distance is normalized, and a weight for that disjointed path is determined using the normalized distance, the WCI value, the WSR value. The weight for each disjointed path of the plurality of disjointed paths is sent to each switch for use in selecting a next switch on a path to a destination.

BRIEF DESCRIPTION OF THE DRAWINGS

Referring now to the drawings in which like reference numbers represent corresponding parts throughout:

FIG. 3 illustrates a weight model in accordance with certain embodiments.

FIG. 12A illustrates a reward function in accordance with certain embodiments.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
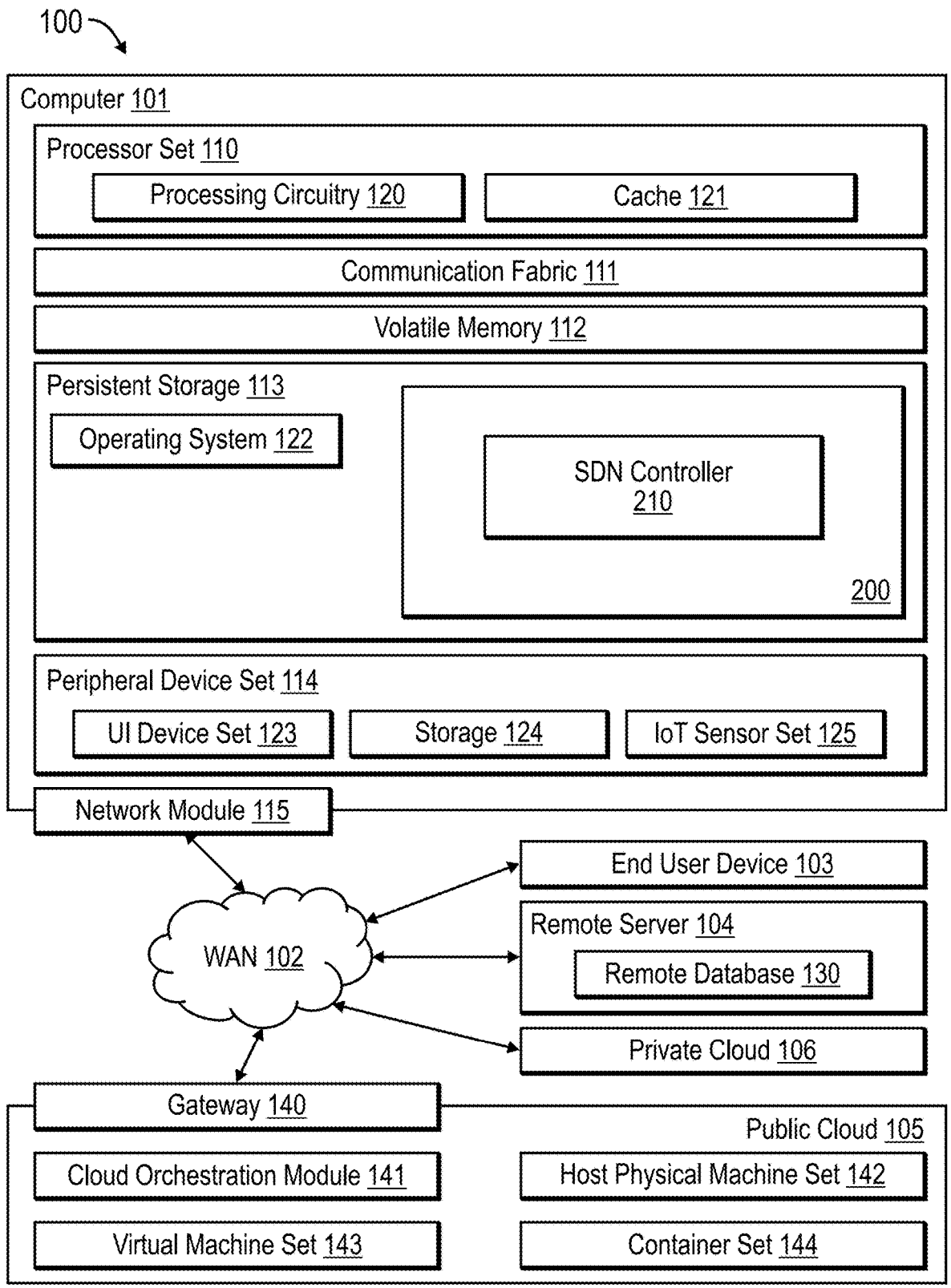
FIG. 1 illustrates a computing environment in accordance with certain embodiments.

Computing environment 100 of FIG. 1 contains an example of an environment for the execution of at least some of the computer code involved in performing the inventive methods, such as a Software-Defined Networking (SDN) controller 210 of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set 110 may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
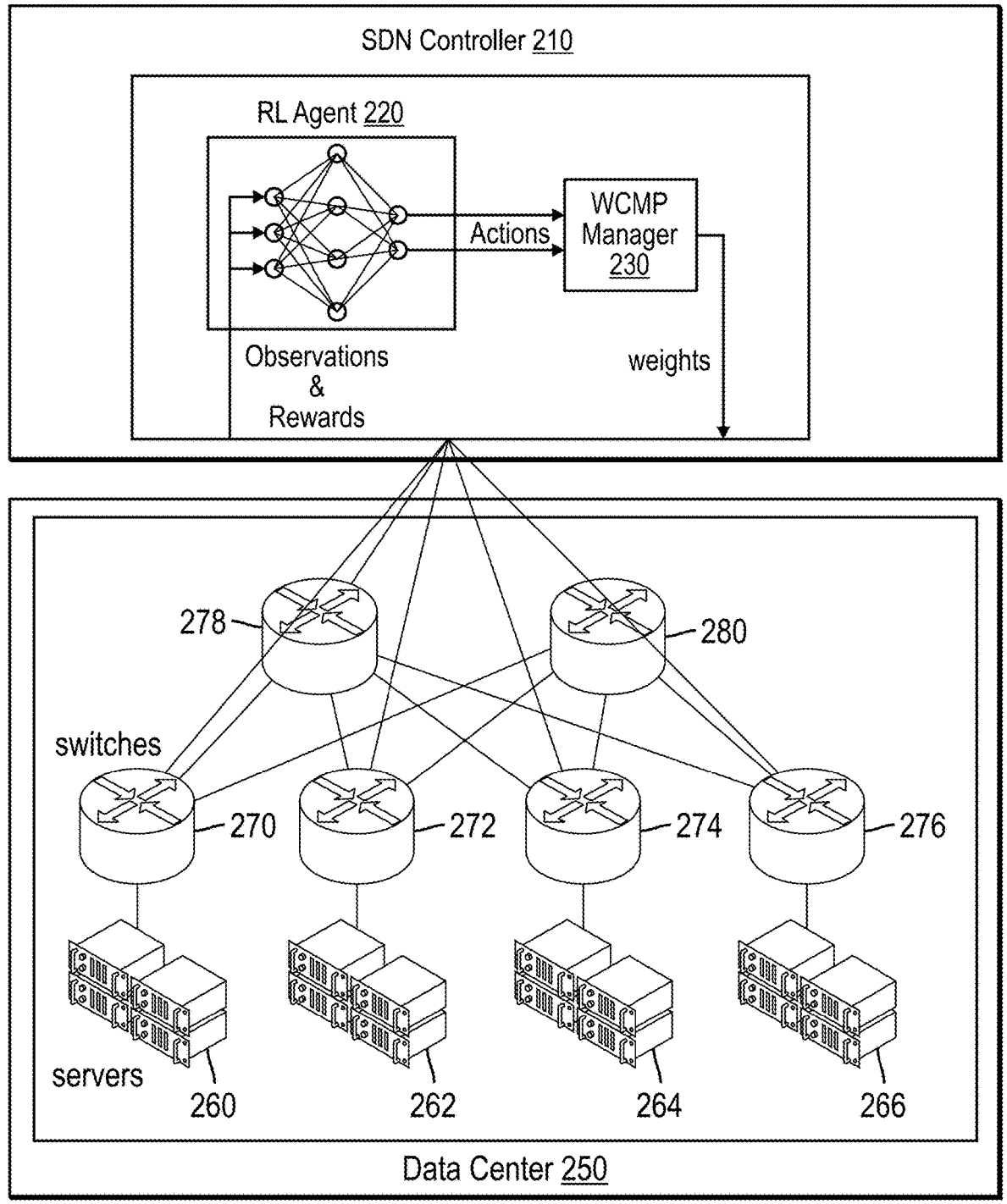
FIG. 2 illustrates a computing environment with an SDN controller in accordance with certain embodiments.

FIG. 2 illustrates a computing environment with an SDN controller 210 in accordance with certain embodiments. The SDN controller 210 includes a Reinforcement Learning (RL) agent 220 and a Weighted-Cost Multi-Path (WCMP) manager 230. The SDN controller 210 is connected to a data center 250. The data center 250 includes servers 260, 262, 264, 266 and switches 270, 272, 274, 276, 278, 280.

In certain embodiments, the RL agent 220 is a machine learning model that receives observations as inputs, calculates rewards, and outputs actions (i.e., values for WSR and WCI). In certain embodiments, observations may include hop latency, queue occupancy, port utilization, a switch polling interval, and a weight update interval. In certain embodiments, the action may include discrete values for WCI ranging from 10 to 100 and discrete values for WSR ranging from 0.1 to 20.

In certain embodiments, the WCMP manager 230 receives the actions and outputs a weight using a weight model (e.g., a weight function).

In certain embodiments, the SDN controller 210 receives, from the switches 270, 272, 274, 276, 278, 280, observations (i.e. network statistics) for the network topology and calculates rewards based on queue occupancy and port utilization. In certain embodiments, the observations include: hop latency (i.e., the latency induced by each hop on the network as packets of a data flow go from the source server to the destination server), queue occupancy (i.e., how full the queue is with data flows), port utilization (i.e. the throughput of a given port), a switch polling interval (i.e., how often the SDN controller 210 polls the switches for observations), and a weight update interval (i.e., how often the SDN controller 210 provides an updated weight to the switches).

In certain embodiments, the RL agent 220 of the SDN controller 210 calculates a reward using a reward function. In such embodiments, when observations are received from a switch 270, 272, 274, 276, 278, 280, the port utilization and queue occupancy are inserted into the reward function, and the reward function returns the reward based on those observations. For example, if the queue occupancy is 0 and the port utilization is 1, the reward function returns the highest reward.

The switches 270, 272, 274, 276, 278, 280 send the observations to the logically centralized SDN controller 210, where the RL agent 220 uses the observations as inputs to the machine learning model, calculates the reward, and selects output actions (i.e., values of WSR and WCI) to maximize the expected utility (i.e., the reward). That is, the RL agent 220 outputs the WSR and the WCI to the WCMP manager 230. The WCMP manager 230 then inserts these actions (i.e., the values of the WSR and the WCI) into the weight model to obtain the corresponding weights. The weights are then injected into the switches 270, 272, 274, 276, 278, 280. The switches 270, 272, 274, 276, 278, 280 leverage the weights in the network topology to decide which path, of multiple paths, to use for a flow of data. A path may be described as containing multiple links, and a link may be described as a connection from a source (e.g., a server, a switch or the SDN controller 210) to a destination (e.g., a server, a switch or the SDN controller 210).

In certain embodiments, each of the switches 270, 272, 274, 276, 278, 280 includes an operating system and hardware for executing applications, such as an application that receives weights from the SDN controller 210 and apply those weights when identifying a next switch in the path for the data flow.

With the AI-driven WCMP approach, three fundamental questions are addressed:
1. What network measurement should be used to obtain weights?
2. What mathematical model governs the relationship between network measurements and weights?
3. How is uncertainty between weights and network state accounted for? This is because the network state when measurements were taken to obtain weights may have changed prior to the injection of weights at the switches.

In certain embodiments, the SDN controller 210 uses the RL agent 220 to address the AI-driven WCMP. With embodiments, the three fundamental questions are answered as follows:
1. The SDN controller 210 uses available link capacity as the network measurement to obtain weights.
2. The SDN controller 210 uses a weight model (i.e., a new mathematical model) that governs the relationship between the network measurements and weights.
3. The SDN controller 210, to account for uncertainty, uses the weight model, which has the following two components: a WSR and a WCI.

FIG. 3 illustrates a weight model 300 in accordance with certain embodiments. The weight model 300 uses WSR ($\sigma$) and WCI ($\mu$) to determine a weight as follows:
A first value is generated when the distance from the overall minimum available capacity is divided by a normalizer.
A second value is generated when the value one ("1") is divided by the WSR.
A third value is generated when the first value is raised to the power of the second value (i.e., the first value is the base, and the second value is the exponent).
A fourth value is generated when the WCI is multiplied by the third value.
The weight (i.e. a fifth value) is generated when 1 is added to the fourth value.

In certain embodiments, the distance is a percentage distance. The percentage distance may be described as the distance from a path's available capacity to the minimum available capacity, divided by the maximum available capacity, and converted to a percentage.

In the weight model 300, the WCI determines the aggressiveness of the weights. For a given WCI, the WSR determines the curvature which impacts the sensitivity of weights such that, with a lower value of WSR, the weights are less responsive; and, with a higher value of WSR, the weights are more responsive. Intuitively, for a given WCI, WSR tunes the sensitivity of the weights. Furthermore, for a given WCI, adjusting WSR changes the weights accordingly as the weight function of the weight model transitions between a concave and a convex function. The +1 in the weight model ensures that the minimum weight is set to 1.

With embodiments, when the WSR and WCI are properly tuned for the network conditions, the network of the data center 250 realizes the full bisection bandwidth. For initial experiments, network conditions were pre-defined, and the WSR and WCI were manually selected. However, for a complex system such as a data center 250, embodiments train the RL agent 220 to learn these two parameters of WSR and WCI. Unlike previous approaches where an RL agent learns the network measurement to be used, the weight model to consume the measurement, and how to account for uncertainty, embodiments provide these to the RL agent 220. Hence, rather than explore a large action space, the RL agent 220 learns to tune the WSR and WCI of the weight model. The WCMP manager 230 leverages the tuned values of WSR and WCI to provide corresponding weights. This approach provides benefits such as flexibility, scalability, and full bisection bandwidth among hosts (e.g., servers).

The SDN controller 210 addresses the challenges inherent in selecting the next switch (e.g., a hop switch) when multiple switches are available on paths between source and destination servers. The SDN controller 210 leverages the RL agent 220 to dynamically obtain the WSR and WCI model parameters and provides an approach to obtain link weights.

Embodiments foster flexibility by considering data centers with both homogenous or heterogenous link capacities and underlying fabric devices. Embodiments are agnostic to the underlying fabric and may be applied to data centers with both homogeneous and heterogenous link capacities. In addition, embodiments are agnostic to the underlying weight techniques embedded within fabric devices. Moreover, embodiments are agnostic to network traffic conditions and upper-layer protocols such as TCP, RoCE, and User Datagram Protocol (UDP).

Embodiments are designed from fundamental building blocks and so are scalable and realize rapid RL agent 220 training because the RL agent tunes two parameters: the WSR and WCI.

Combined, these benefits allow embodiments to capitalize on the high degree of parallelism in the Clos network topology to provide the low latency and full bisection bandwidth required between hosts.

In certain embodiments, the switches 270, 272, 274, 276, 278, 280 may be in a leaf-spine design where all switches 270, 272, 274, 276, 278, 280 are connected to the SDN controller 210 and leaf switches 270, 272, 274, 276 are connected to servers 260, 262, 264, 266. Although two levels of switches 270, 272, 274, 276, 278, 280 have been illustrated, there may be any number of switches and any number of levels of switches in various embodiments.

In certain embodiments, the AI-driven WCMP approach consists of the SDN controller 210, the RL agent 220, the WCMP manager 230, switches 270, 272, 274, 276, 278, 280, and servers 260, 262, 264, 266 (e.g., hosts). In certain embodiments, the switches 270, 272, 274, 276, 278, 280 maintain out-of-band connections to the external SDN controller 210. The SDN controller 210 keeps track of the network topology and link bandwidths. The SDN controller 210 obtains link weights as follows:

For a given source leaf switch, find the minimum available capacity of the disjoints paths to a given destination switch.

For each of the disjoint paths, determine the distance from the disjoint path's available capacity to the minimum available capacity.

Insert the resulting distance for each path into the weight model to determine the corresponding weight.

The weight model is dependent on two parameters: the WSR and the WCI. Given the network state, the RL agent 220 selects values for the WSR and the WCI to maximize the expected utility. With any WCMP approach, the following are determined: the network measurement to be used, the weight model to consume the network measurement, and how to account for uncertainty between calculated weights and the network state. Learning these three components while leveraging a continuously changing network demand as part of the observation, increases the likelihood of an RL agent 220 solution that does not converge. With embodiments, the RL agent 220 in the AI-driven WCMP approach is provided with the network measurement to be used, the weight model, and the capability to account for uncertainty. Hence, the RL agent 220 rapidly learns to tune the WCI and WSR for use by the WCMP manager 230 to obtain weights. Furthermore, the weight model is designed with three fundamental objectives:

For a given disjoint path between a source leaf switch and a destination leaf switch, the further the distance of available capacity from the minimum available capacity, the higher the probability of selecting this path.

The sensitivity of weights is controlled. In particular, for a given WCI, the WSR provides a mechanism to tune the WCI.

The aggressiveness of weights is controlled. In particular, the confidence in the network state (i.e., available capacity) on a path is reflected in the value of the weight: if there is high confidence (e.g., greater than a confidence threshold), the weight is high; and, if the confidence is low (e.g., less than or equal to the confidence threshold), the weight is low.

With the AI-driven WCMP approach, the weight model has two tunable parameters: the WSR and the WCI. In certain embodiments, manual tuning may realize optimal network performance, however, given the complexities inherent in networking, the AI-driven WCMP approach leverages the RL agent 220 to dynamically select the WSR and the WCI parameters.

Figure 4:
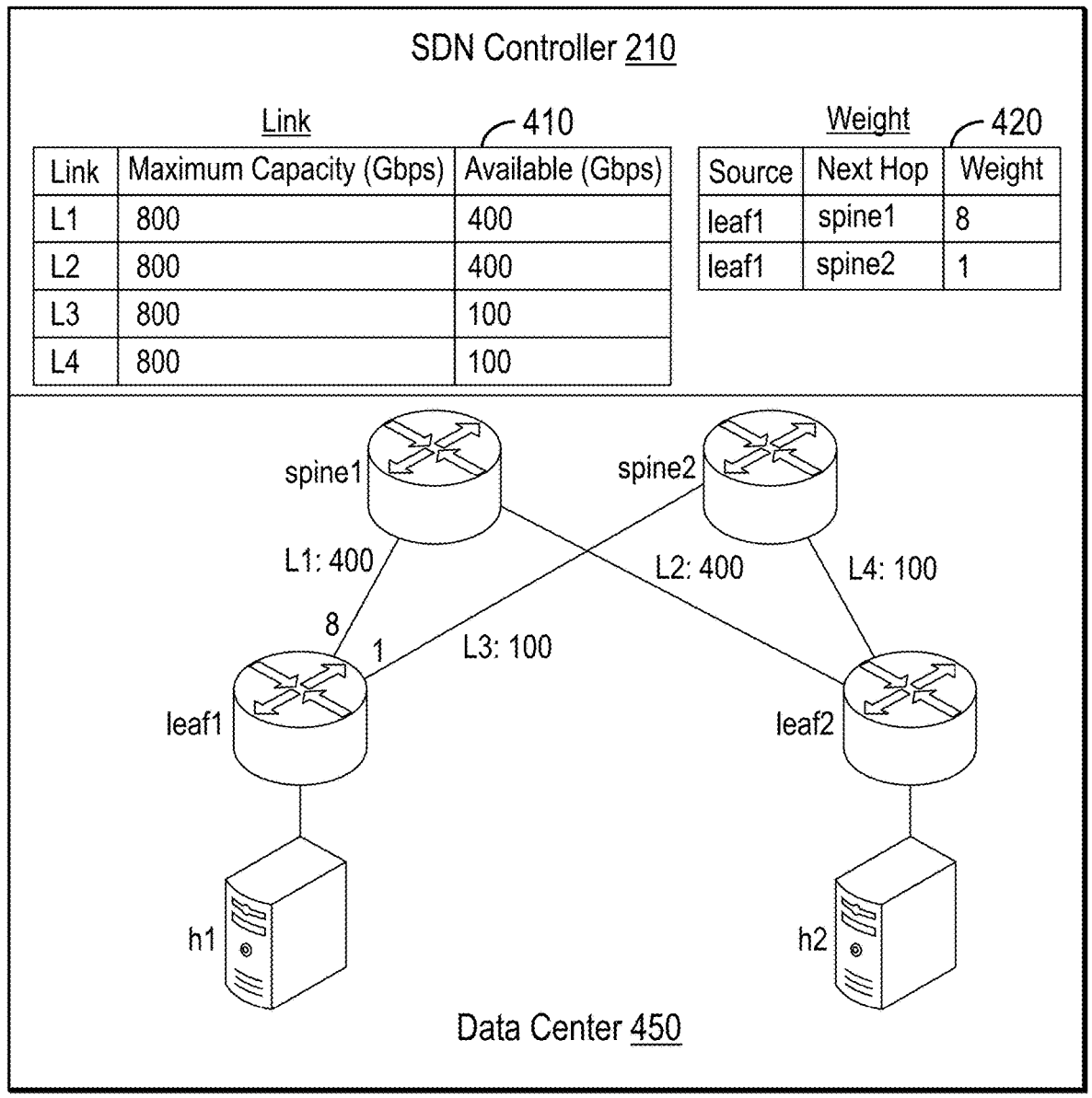
FIG. 4 illustrates determination of a next hop switch from a leaf switch in accordance with certain embodiments.

FIG. 4 illustrates determination of a next hop switch from leaf switch in accordance with certain embodiments. In FIG. 4, the SDN controller 210 is connected to a data center 450. The SDN controller 210 maintains a link table 410 and a weight table 420. The data center 450 includes host h1, host h2, switch leaf1, switch leaf2, switch spine1, and switch spine 2.

The link table 410 has three columns: a link identifier for a link, a maximum capacity (Gigabits per second (Gbps)) for the link, and an available capacity (Gbps) for the link. For example, each link L1, L2, L3, L4 has maximum capacity of 800 Gbps. Links L1 and L2 have available capacity of 400 Gbps (meaning that 400 Gbps are already being utilized for transmitting other data flows). Links L3 and LA have available capacity of 100 Gbps (meaning that 700 Gbps are already being utilized for transmitting other data flows).

The weight table 420 has three columns: source switch, next hop switch, and weight. For source switch leaf1 to destination switch spine1, the weight is 8. For source switch leaf1 to destination switch spine2, the weight is 1.

In FIG. 4 the logically centralized SDN controller 210 keeps track of a) the network topology, b) link resources in the link table 410, and 3) weights generated by the weight model in the weight table 420. In this example, host h1 intends to communicate with host h2 over a network where links are utilized. In FIG. 4, each link is annotated with the Link Name and Available Capacity (Link Name: Available Capacity). Continuing with this example, given two paths: [L1:L2] (i.e., a first path along link L1 and link L2) and [L3:L4] (i.e., a second path along link L3 and link L4), the SDN controller 210 obtains the associated weights at switch leaf1.

Initially, the SDN controller 210 obtains the fabric topology from out-of-band connections to the switches. The SDN controller 210 tracks link capacities in the link table 410.

Next, the SDN controller 210 finds the disjoint paths from switch leaf1 to switch leaf2, which are:

Path1: [L1:L2]
Path2: [L3:L4]

For each path, the minimum available capacity is determined as follows:

$$Path1 = 400 \text{ minimum available capacity}$$
$$Path2 = 100 \text{ minimum available capacity}$$

The SDN controller 210 finds the minimum available capacity for the possible paths (i.e., both Path1 and Path2 in this example):

$$Minimum = 100$$

For each path, the SDN controller 210 finds the distance from the minimum available capacity:

$$Path1 = 400 - 100 = 300 \text{ distance}$$
$$Path2 = 100 - 100 = 0 \text{ distance}$$

The SDN controller 210 normalizes the distance results by the maximum link capacity:

$$Path1: (300/800)100 = 37.5 \text{ normalized distance}$$
$$Path2: (0/800)100 = 0 \text{ normalized distance}$$

In this example, a WSR of 0.2 and a WCI of 9 is used. In certain embodiments, with these values, the SDN controller 210 determines the weights as follows:

$$Path1: (37.5/100)^{.2}9 + 1 = 8$$
$$Path2: (0/100)^{.2}9 + 1 = 1$$

Figure 5:
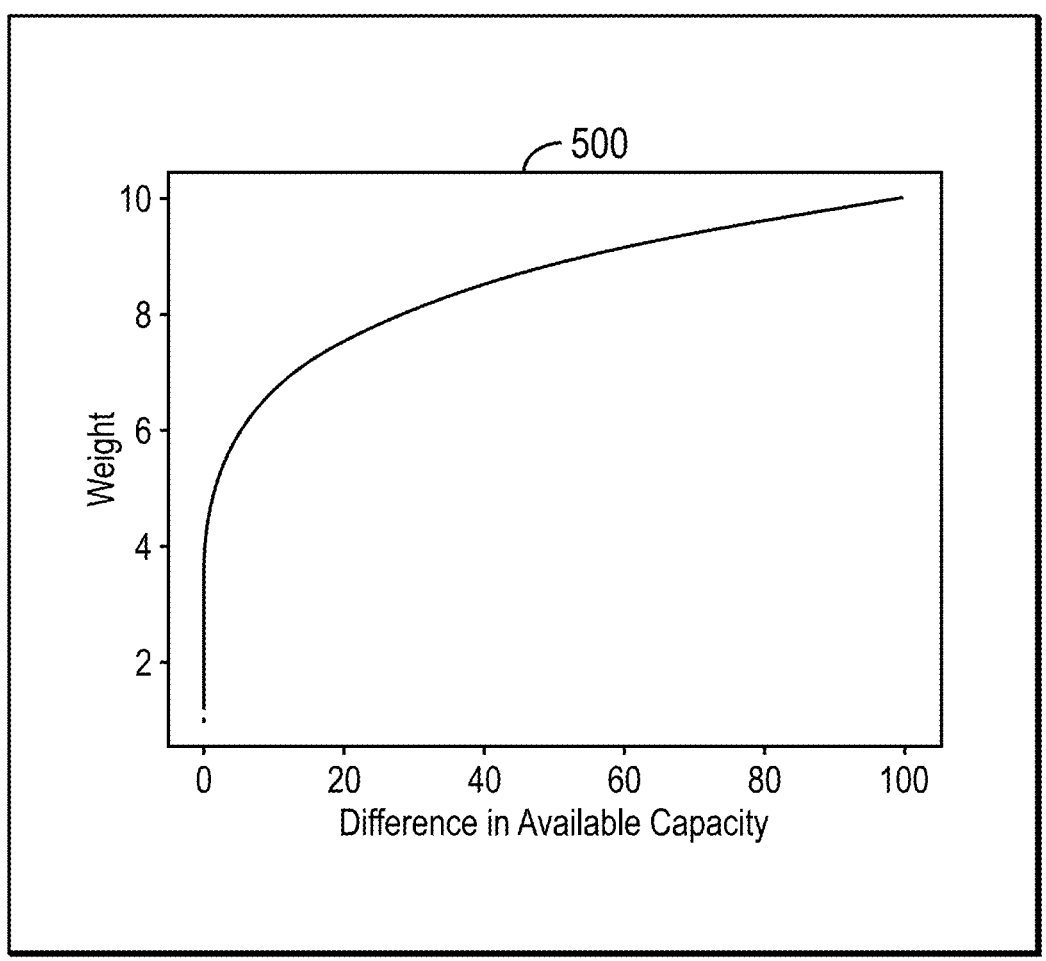
FIG. 5 illustrates a graph of weight to difference in available capacity in accordance with certain embodiments.

FIG. 5 illustrates the graph 500 of weight to difference in available capacity in accordance with certain embodiments for the example described in FIG. 4. FIG. 5 illustrates the corresponding graph for the weight model illustrated in FIG. 4. The SDN controller 210 notifies leaf1 that the weight for Path1 is 8, while the weight for Path2 is 1.

Thus, switch leaf1 uses weights of 8 and 1 to influence the next hop path decision. Intuitively, given more available capacity at path 1, the SDN controller 210 provides a higher probability of path 1 being selected over path 2 by switch leaf1.

Figure 6A:
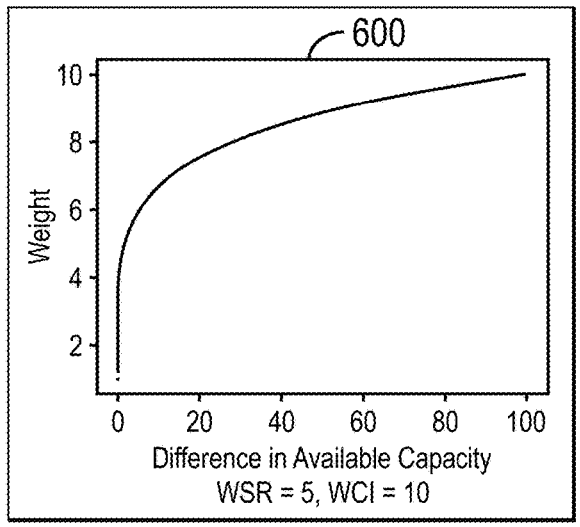
FIGS. 6A, 6B, and 6C illustrate the interplay between Weight Sensitivity Response (WSR) and Weight Certainty Indicator (WCI) with graphs in accordance with certain embodiments.
Figure 6B:
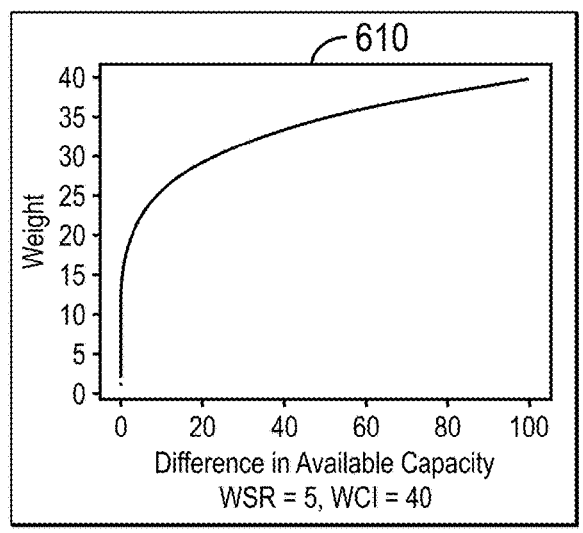
Figure 6C:
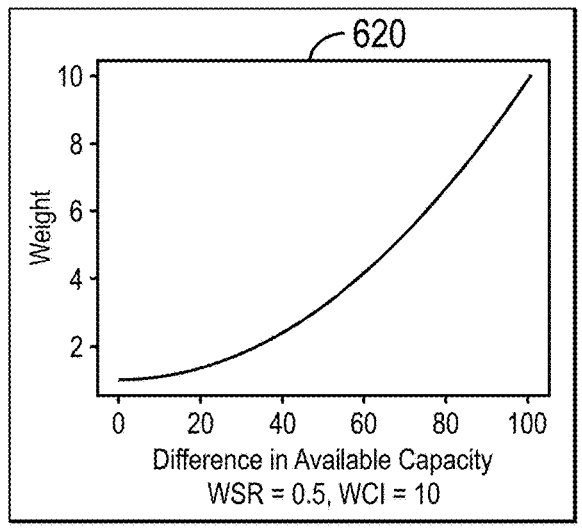

FIGS. 6A, 6B, and 6C illustrate the interplay between WSR and WCI for corresponding graphs 600, 610, and 620 in accordance with certain embodiments. In FIGS. 6A and 6B, the WSR is constant at 5, while the WCI is 10 in FIG. 6A and increases to 40 in FIG. 6B, which results in the weights increasing to 40. In FIGS. 6A and 6C, the WCI is constant at 10, while the WSR is 5 in FIG. 6A and decreases to 0.5 in FIG. 6C, which results in the curvature of the weight function changing from convex to concave. Hence, for a given WCI, the WSR may be used to tune the responsiveness of the weight function.

Merely to enhance understanding of embodiments, experiments using the weight model will be discussed.

In one experiment, the AI-driven WCMP approach is applied to a small-scale virtual network to ascertain the functionality and behavior under the best-case scenario and the worst-case scenario. In the best-case scenario, weights are updated faster than data flows arrive at the switch. In the worst-case scenario, data flows arrive faster than weights are updated at the switch.

In this experiment, given limitations on the Central Processing Unit (CPU) cores allocated to each virtual switch, the data flow sizes have been scaled to ensure that the CPU cores are not completely utilized. Hence, with a maximum of 8 data flows at 0.25 Megabits (Mbps) per data flow (or 2 Mbps of traffic) through the switch, approximately 80% of the CPU is utilized.

Figure 7:
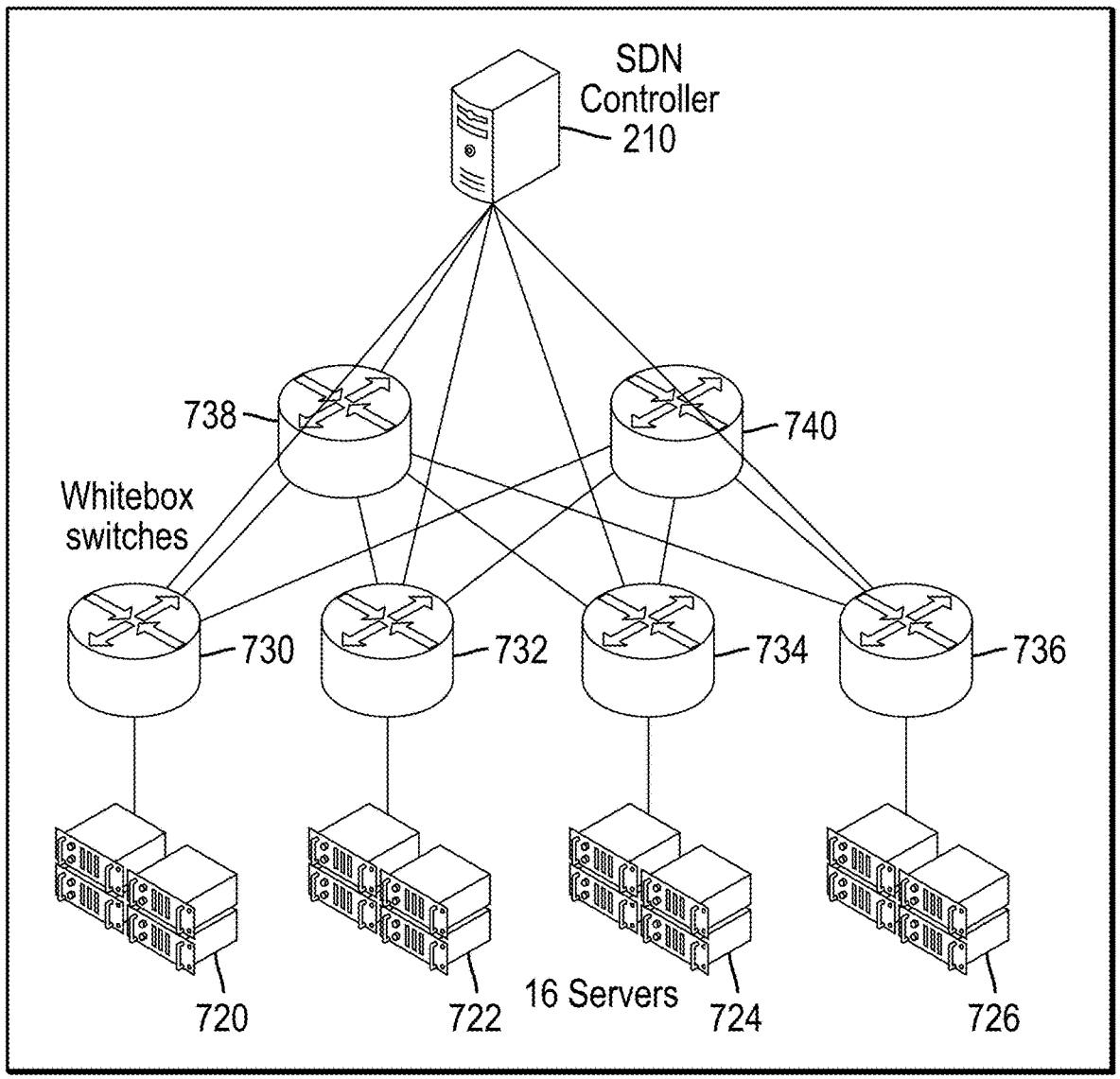
FIG. 7 illustrates an example network topology in accordance with certain embodiments.

FIG. 7 illustrates an example network topology in accordance with certain embodiments. In FIG. 7, the network topology is 2×4×16 (i.e., two spine switches 738, 740; four leaf switches 730, 732, 734, 736, and 16 namespaces/servers illustrated in groups of four 720, 722, 724, 726). In this example network topology, the maximum link capacity is 2 Mbps the flow size is 0.25 Mbps; the maximum number of data flows on each leaf-spine link is 4; the total throughput through a link is 2 Mbps; the traffic pattern is 1 source from each leaf to 8 destinations; the weights update interval is 5 seconds(s); the Flow Interarrival Time (FIT) is 1-10 s; the data flow statistic collection interval is 1 s; and the number of runs for each experiment ("trial") is 15.

Given the description of the network topology of FIG. 7, 8 flows egress each leaf switch towards the spine switches. In certain embodiments, the optimal solution is to distribute 4 flows to each spine switch and, hence, the throughput measured through the links is 2 Mbps, where all links are fully utilized.

In certain embodiments, the AI-driven WCMP approach was used in the experiments, and, for each experiment, a value for WSR, WCI, and the time each flow arrives at the switch (i.e., the Flow Interarrival Time: FIT) are specified. Each experiment is repeated 15 times. For each of the 15 experiments, 8 flows are sourced from a server connected to each leaf switch to 8 different destination servers. The values of WSR and WCI are selected for the weight model to determine the weights for egress ports from leaf switches to spine switches. Then the throughput through each link was measured and the average of all links was determined. A distribution of throughput measurements over the 15 experiments was plotted.

In addition, for comparison, the ECMP approach was applied. For the ECMP approach, the same FIT was used, and 15 experiments of the ECMP approach were performed (i.e., ECMP was leveraged to select egress ports from leaf to spine). Then, the ECMP results were plotted for comparison with the AI-driven WCMP approach.

With these experiments, the throughput changed through each link as WSR, WCI, and the FIT changes. For these experiments, the AI-driven WCMP approach results in a higher throughput distribution than the ECMP approach. It is observed that for correct values of WSR and WCI, even though data flows arrive faster than switch weights are updated, the throughput on the links are approximately 2 Mbps, which indicates that the AI-driven WCMP approach achieves full bisection bandwidth for both best and worse-case scenarios.

Figure 8C:
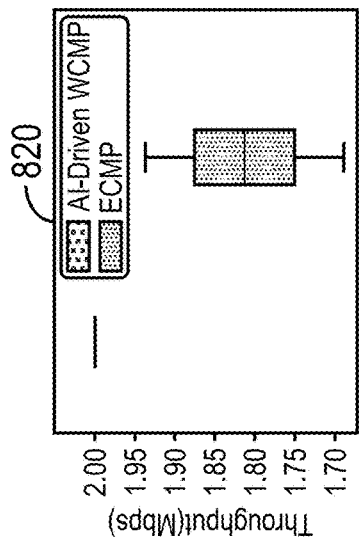
FIGS. 8A, 8B, 8C, 8D, 8E, and 8F illustrate graphs of results of Experiment 1 in accordance with certain embodiments.
Figure 8B:
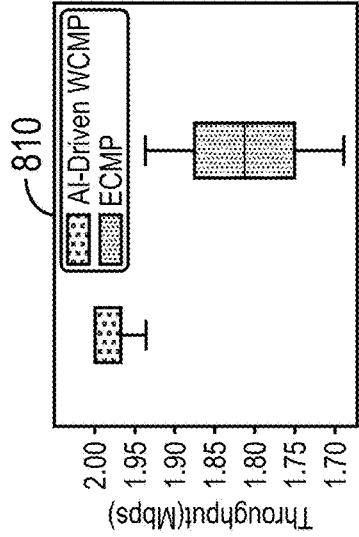
Figure 8A:
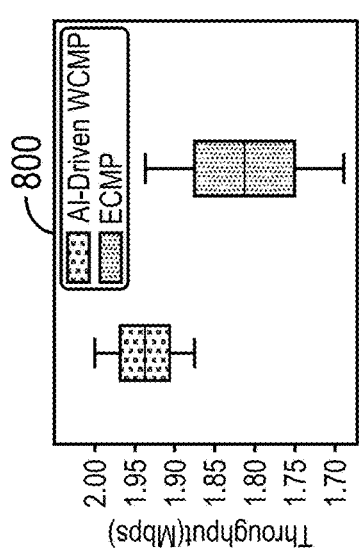
Figure 8F:
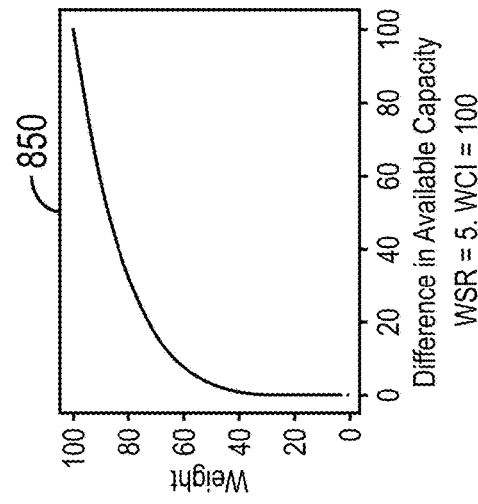
Figure 8E:
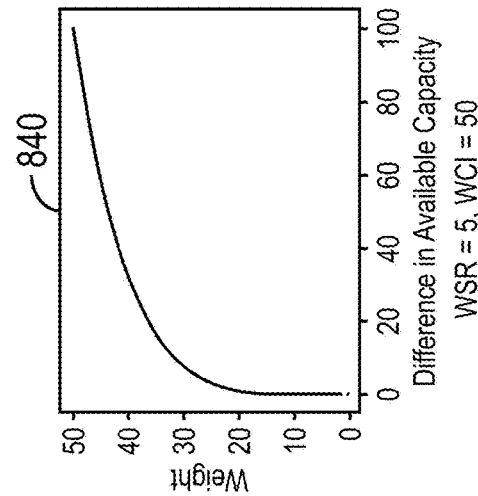
Figure 8D:
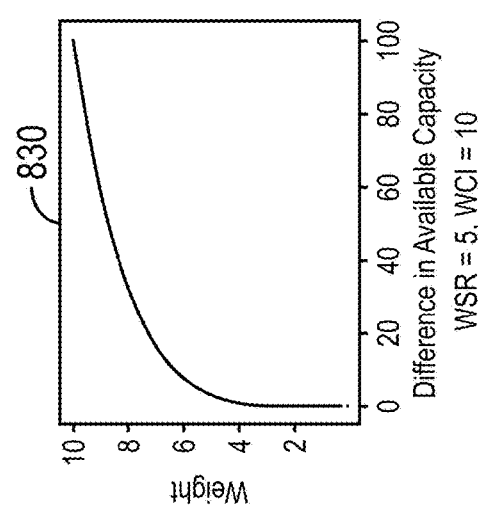

FIGS. 8A, 8B, 8C, 8D, 8E, and 8F illustrate graphs 800, 810, 820, 830, 840, 850 of results of Experiment 1 in accordance with certain embodiments. In Experiment 1, increasing WCI while maintaining a FIT of 10 s results in the best-case scenario. In Experiment 1, each server initiates a data flow every 10 s and weights are evaluated and pushed to the switches every 5 s. This indicates that the switch weights are being updated twice as fast as data flows are arriving at the switches. Hence, there is a high certainty of the network state between the time data flow statistics are collected and the weights are updated at the switches. The graphs 800, 810, 820 capture the throughput comparison of the AI-driven WCMP approach against the ECMP approach. The values of WSR and WCI used for each of these figures is shown in FIGS. 8D, 8E, and 8F, respectively. At a WCI of 10 from FIG. 8D, the corresponding median throughput for WCMP from FIG. 8A is about 1.94 Mbps. When the WCI is increased to 100 in FIG. 8F, the corresponding median throughput for WCMP is 2 Mbps in FIG. 8C. The ECMP approach realized a throughput of approximately 1.8 Mbps. Hence, given the certainty of the network state, FIGS. 8D, 8E, and 8F highlight that increasing WCI from 10 to 100 produces optimal throughput results in the corresponding FIGS. 8A, 8B, and 8C.

Figure 9A:
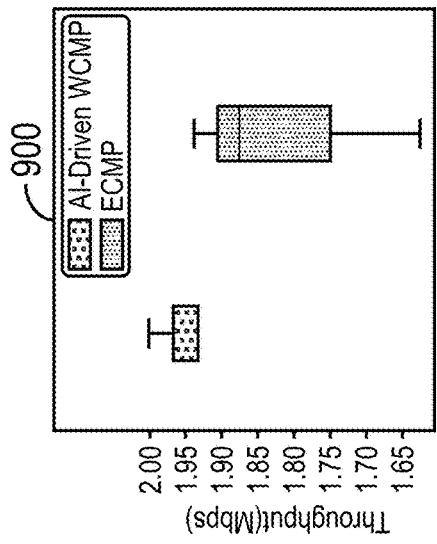
FIGS. 9A, 9B, 9C, 9D, 9E, and 9F illustrate graphs of results of Experiment 2 in accordance with certain embodiments.
Figure 9B:
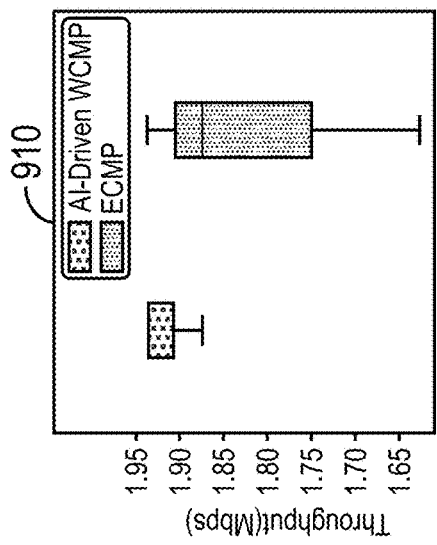
Figure 9C:
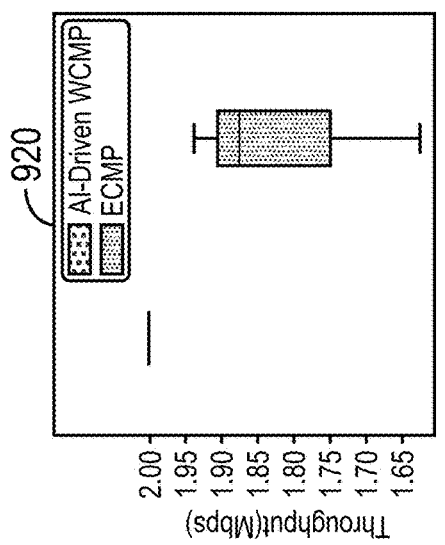
Figure 9D:
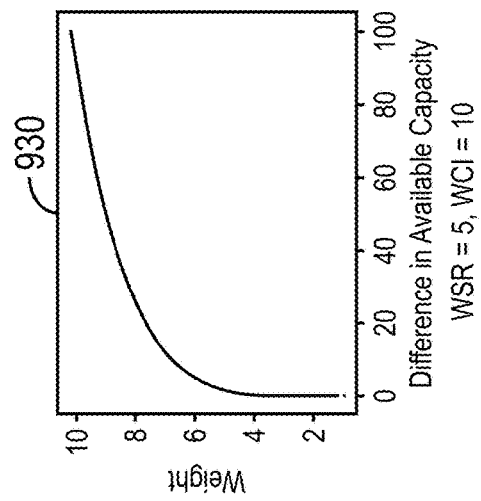
Figure 9E:
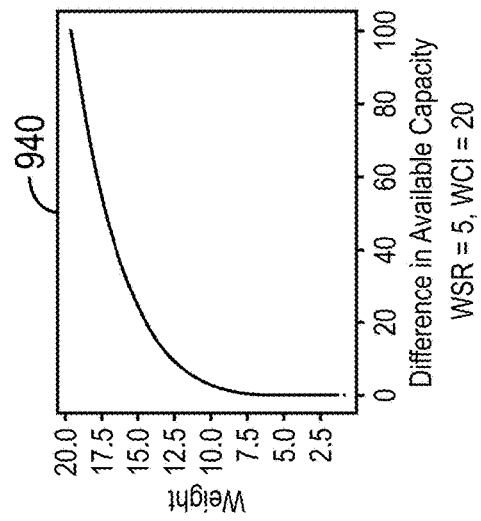
Figure 9F:
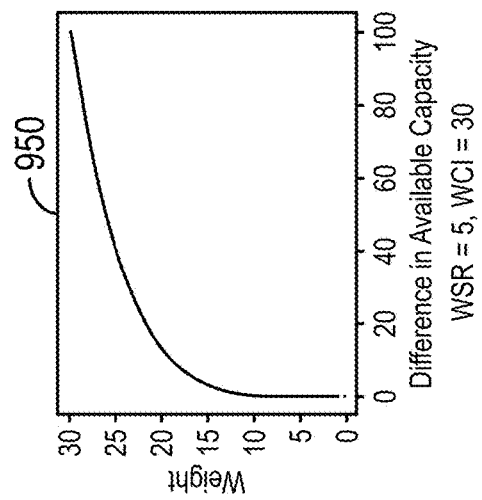

FIGS. 9A, 9B, 9C, 9D, 9E, and 9F illustrate graphs 900, 910, 920, 930, 940, 950 of results of Experiment 2 in accordance with certain embodiments. In Experiment 2, WCI is increased, while maintaining a FIT of 5 s. In Experiment 2, each server initiates a data flow every 5 s and weights are evaluated and pushed to the switches every 5 s. This indicates that the switch weights are being updated as fast as data flows are arriving at the switches. Hence, the certainty of the network state between the time data flow statistics are collected and the weights are updated at the switches is lower than Experiment 1 (i.e., with a FIT of 10 s). This lower certainty is reflected in the WCI values of 10, 20, and 30 used in FIGS. 9D, 9F, and 9E, respectively. In Experiment 2, FIG. 9C shows that the optimal throughput of 2 Mbps is obtained given a WCI of 30. Once again, the ECMP approach realized a lower throughput of approximately 1.9 Mbps.

FIGS. 10A, 10B, 10C, 10D, 10E, and 10F illustrate graphs 1000, 1010, 1020, 1030, 1040, 1050 of results of Experiment 3 in accordance with certain embodiments.

Figure 10A:
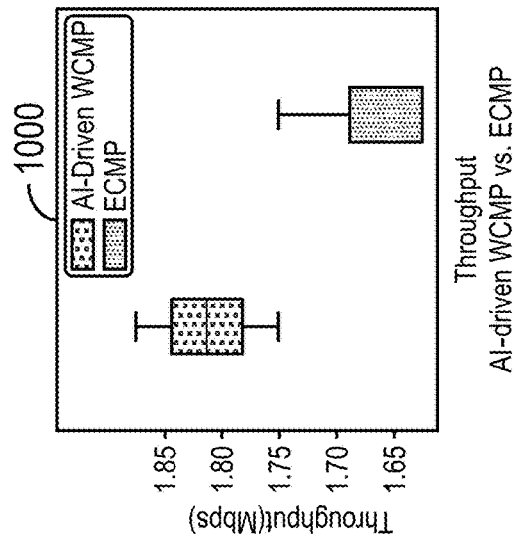
FIGS. 10A, 10B, 10C, 10D, 10E, and 10F illustrate graphs of results of Experiment 3 in accordance with certain embodiments.
Figure 10B:
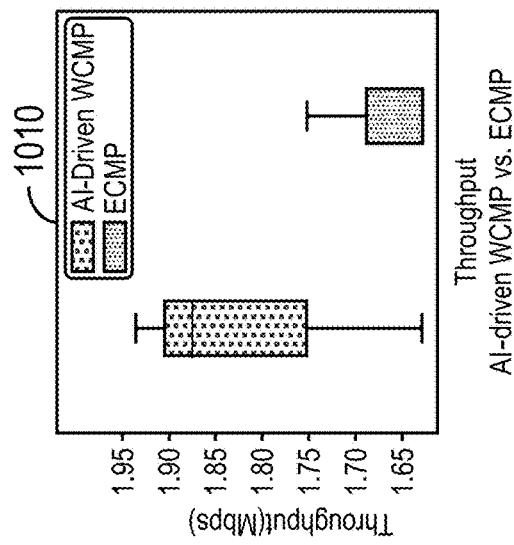
Figure 10C:
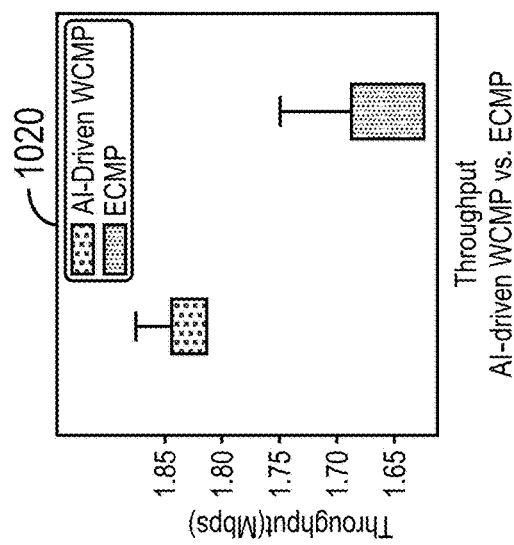
Figure 10D:
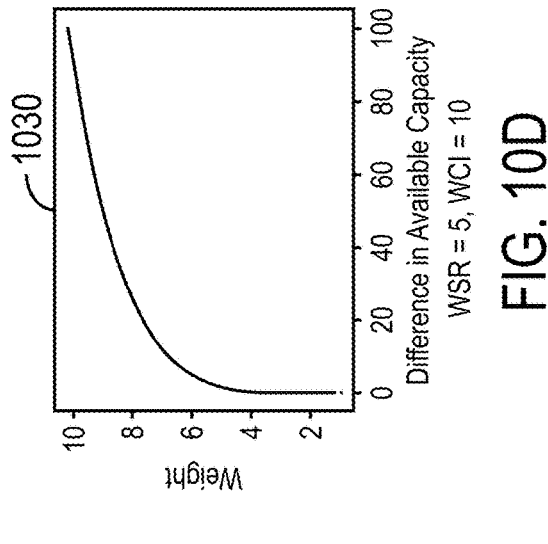
Figure 10E:
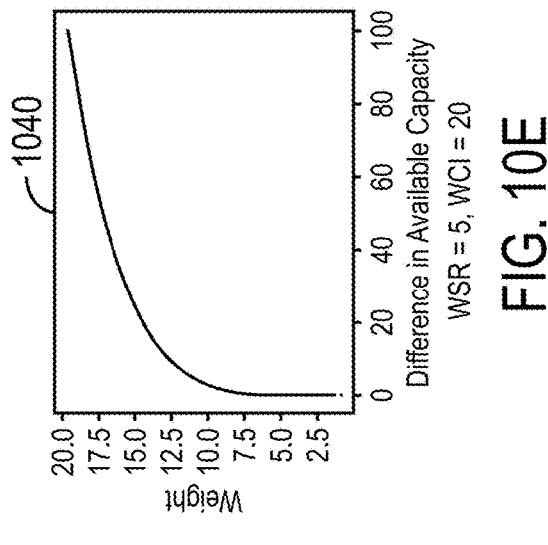
Figure 10F:
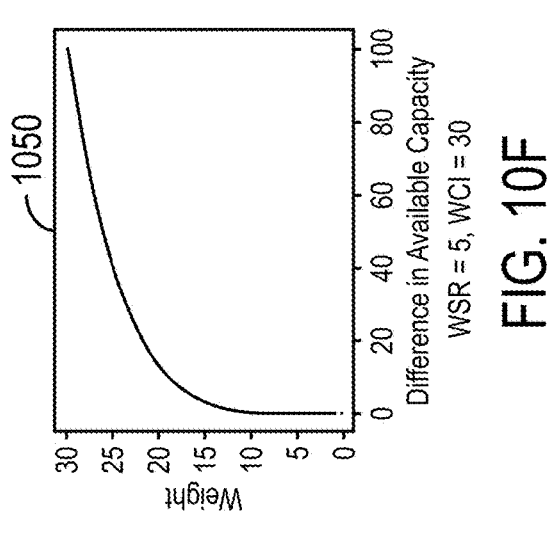
Figure 11A:
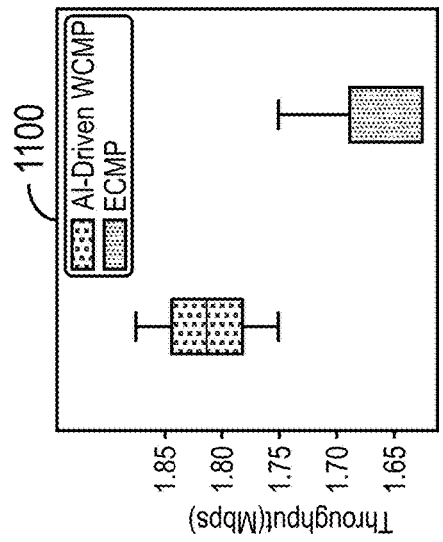
FIGS. 11A, 11B, 11C, 11D, 11E, and 11F illustrate graphs of results of Experiment 4 in accordance with certain embodiments.
Figure 11B:
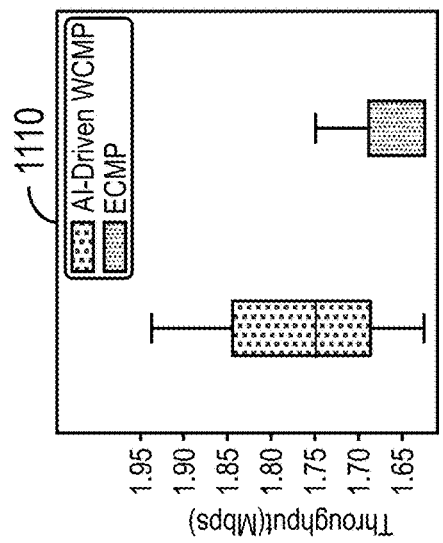
Figure 11C:
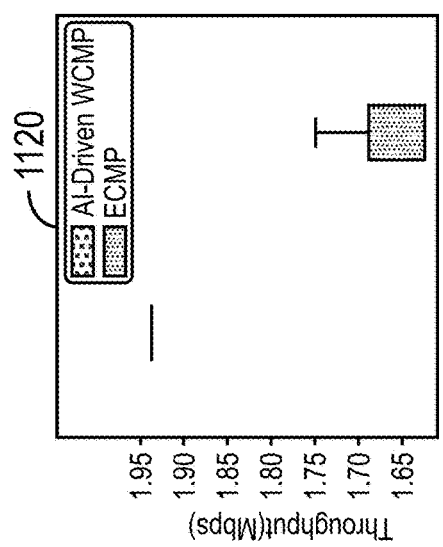
Figure 11D:
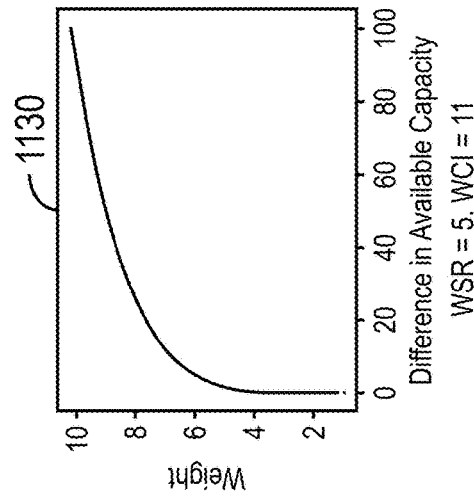
Figure 11E:
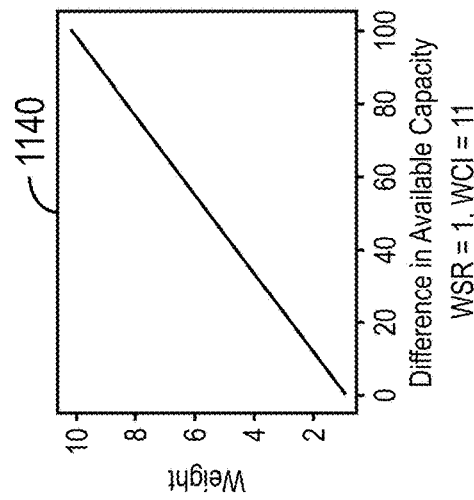
Figure 11F:
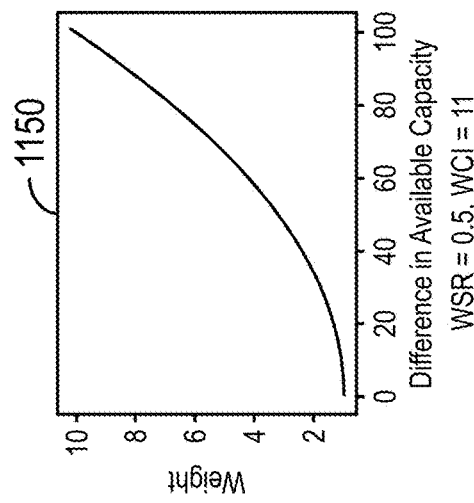

In Experiment 3, the WCI is increased while maintaining a FIT of Is. In Experiment 3, each server initiates a data flow every 1 s and weights are evaluated and pushed to the switches every 5 s. This indicates that data flows are arriving twice as fast as switch weights are updated. Hence, the certainty of the network state between the time data flow statistics are collected and the weights are updated at the switches is lower than Experiment 2 (i.e., with an FIT of 5 s). As shown in FIGS. 10D, 10E, and 10F, increasing the WCI to 30 does not have a large effect on the increase in throughput from FIGS. 10A, 10B, and 10C.

FIGS. 11A, 11B, 11C, 11D, 11E, and 11F illustrate graphs 1100, 1110, 1120, 1130, 1140, 1150 of results of Experiment 4 in accordance with certain embodiments.

In Experiment 4, WSR is decreased, while maintaining a FIT of 1 s. In Experiment 4, the weight model is initialized with the parameters of WCI=10 and WSR=5. As the WSR is decreased from 5 to 1 to 0.5 in FIGS. 11D, 11E, and 11F, the throughput transitions to convergence in FIGS. 11A, 11B, and 11C. Intuitively, with approximately 0-25% of the difference in available capacity in FIG. 11F, the corresponding weights are near 1. This indicates that the weight model is operating in ECMP mode. However, when the difference in available capacity becomes larger, the AI-driven WCMP approach aggressively changes the weights.

From the four experiments, the AI-driven WCMP approach enables the throughput to exceed that of the ECMP approach for the values of WSR and WCI selected. In addition, the correct values of WSR and WCI may lead to near optimal throughput under varying network conditions. Given the complexity of networks, the AI-driven WCMP leverages optimization to select the values of WSR and WCI, as opposed to the manual selection of values in the experiments.

FIG. 12A illustrates a reward function 1200 in accordance with certain embodiments. The reward function 1200 uses port utilization and queue occupancy to generate the reward.

Figure 12B:
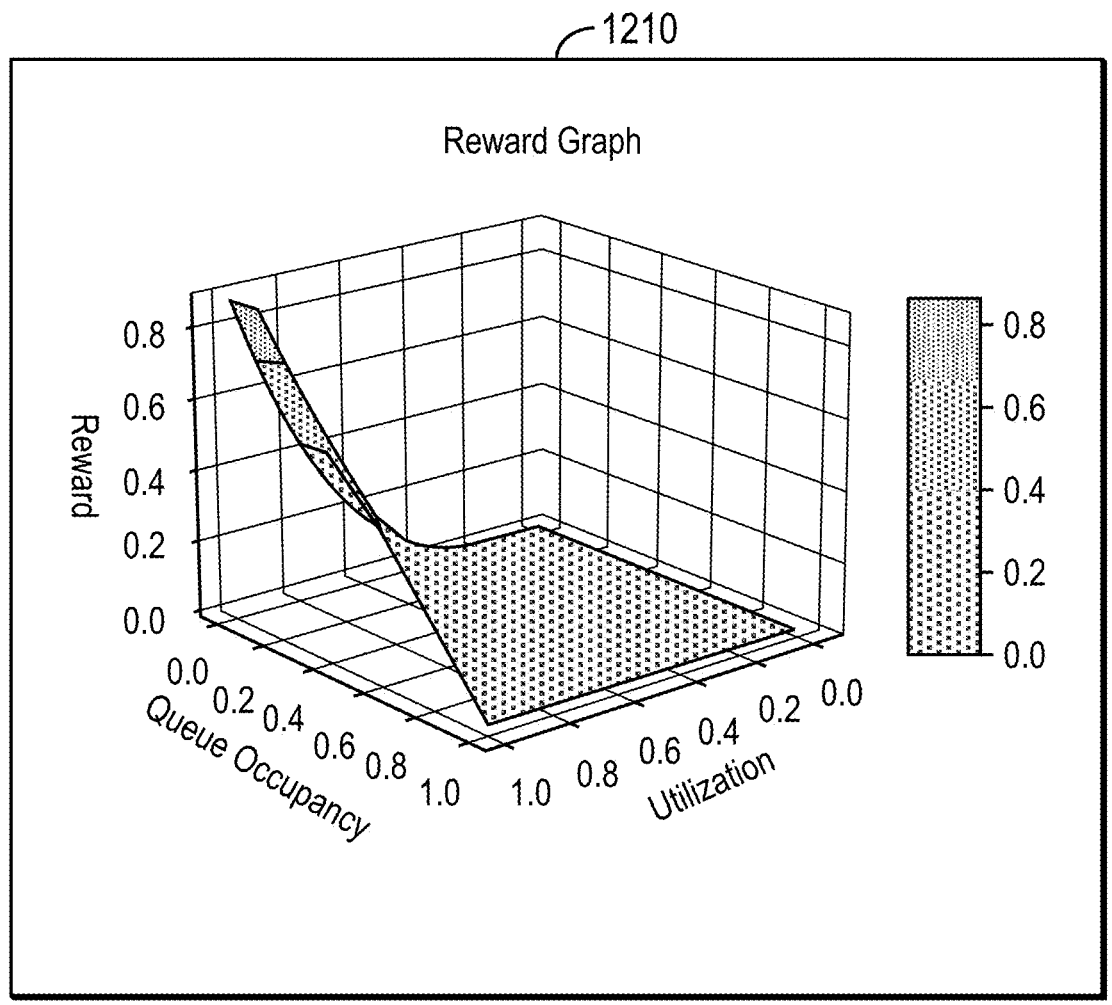
FIG. 12B illustrates a graphical representation of the reward function in accordance with certain embodiments.

FIG. 12B illustrates a graphical representation 1210 of the reward function in accordance with certain embodiments. Below highlights possible observations for RL agent 220:
  Hop latency
  Queue occupancy
  Egress port utilization
  Switch polling interval
  Weight update interval In this example, the actions at the RL agent 220 are a discrete range of values for the WCI and WSR:
  WCI: 10, 20, 30, 40, 50, 60, 70, 80, 90, 100
  WSR: 0.1, 0.2, 0.3, 0.4, 0.5, 1, 2, 5, 10, 20

In this example, as seen from the graphical representation 1210, the reward is maximized when the utilization is increased and queue occupancy decreases. The reward is calculated at RL agent 220. A higher reward indicates that the throughput was closer to the full bisection bandwidth, while a lower reward indicates that the throughput was further from the full bisection bandwidth. The RL agent 220 learns from the rewards and attempts to output better actions in future iterations. For example, if the RL agent 220 receives a low reward, the RL agent 220 re-tunes the WSR and WCI values (e.g., for a next iteration of generating the weight of each path).

Thus, the AI-driven WCMP approach captures the three fundamental components of any WCMP approach: the network measurement to be used; the weight model to consume the network measurement; and how to account for uncertainty between calculated weights and the network state.

Hence, unlike other approaches where these must be learned by the RL agent, the RL agent 220 learning is reduced to learning the values of WSR and WCI that are injected in the weight model. This allows RL agent 220 to rapidly learn the values of WSR and WCI that maximize it's expected utility (i.e. reward).

In certain embodiments, the AI-driven WCMP approach uses the SDN controller 210 to observe the data center network topology, compute available bandwidth for different paths between various pairings of endpoints within the data center network topology, and adjust switch weights in a direction that over-emphasizes the path with higher available bandwidth according to a geometric and/or exponential weighting scheme.

Figure 13A:
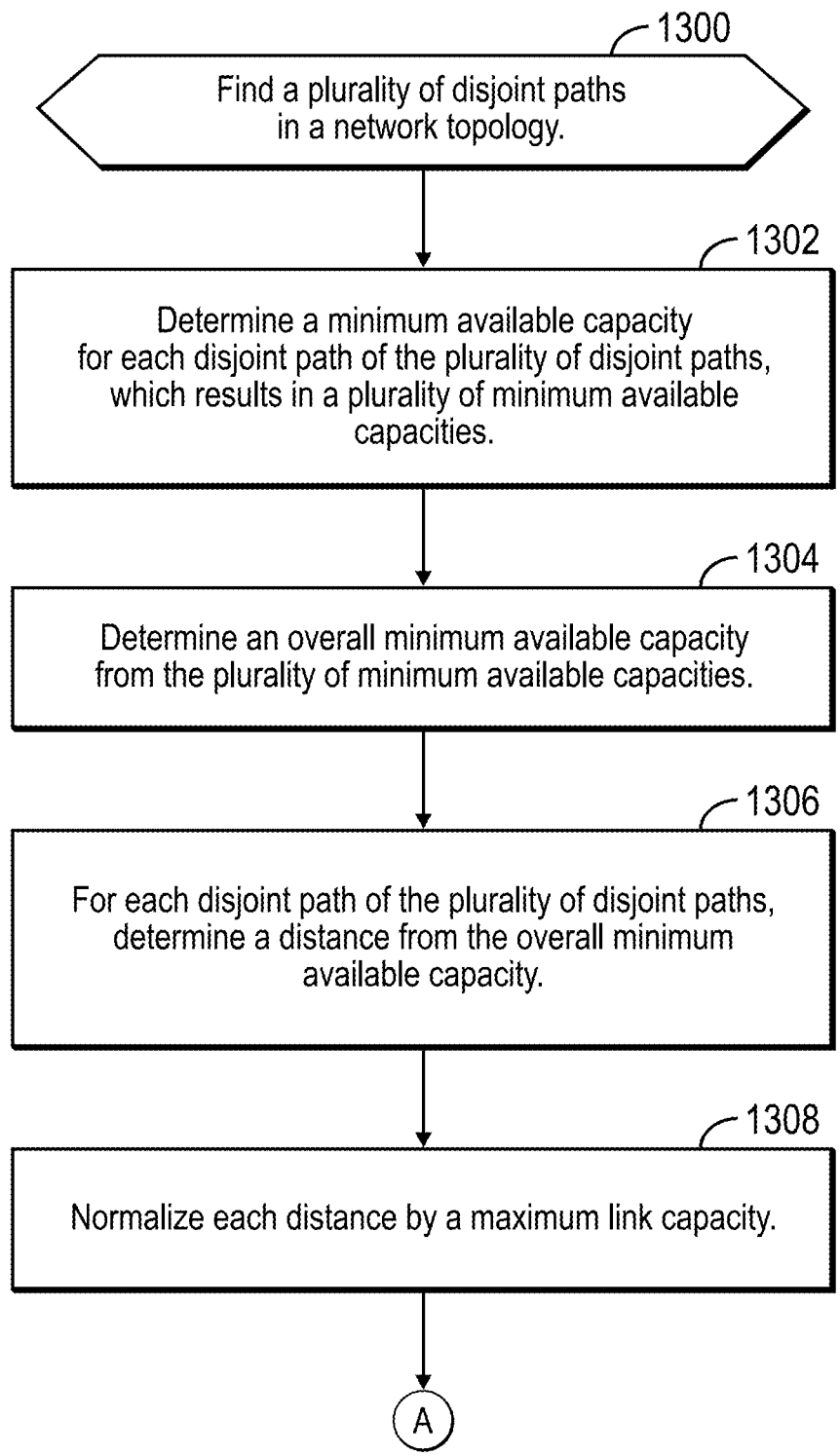
FIGS. 13A and 13B illustrate, in a flowchart, operations by the SDN controller for generating weights for use in identifying paths for data centers in accordance with certain embodiments.
Figure 13B:
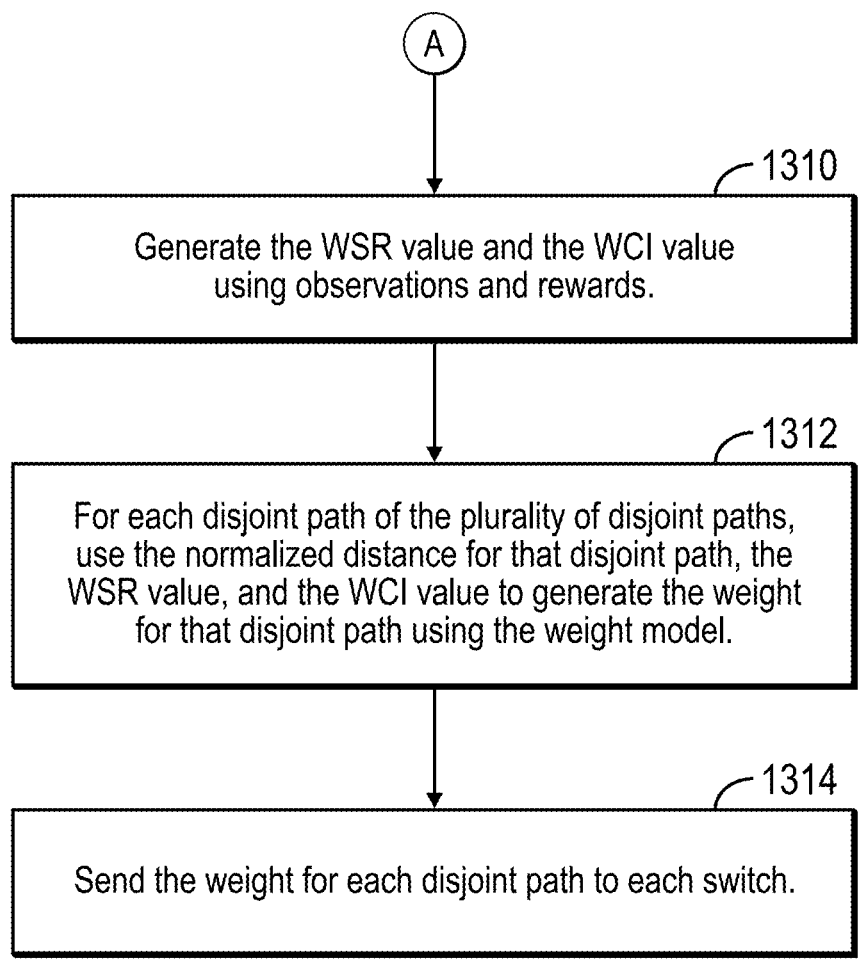

FIGS. 13A and 13B illustrate, in a flowchart, operations by the SDN controller 210 for generating weights for use in identifying paths for data centers in accordance with certain embodiments. Control begins at block 1300 with the SDN controller 210 finding a plurality of disjoint paths in a network topology. In block 1302, the SDN controller 210 determines a minimum available capacity for each disjoint path of the plurality of disjoint paths, which results in a plurality of minimum available capacities corresponding to the plurality of disjoint paths. The minimum available capacity is the maximum capacity of a path minus already allocated capacity.

In block 1304, the SDN controller 210 determines an overall minimum available capacity from the plurality of minimum available capacities. This is done by selecting the smallest minimum capacity from the plurality of minimum available capacities.

In block 1306, the SDN controller 210, for each disjoint path of the plurality of disjoint paths, determines a distance from the overall minimum available capacity. This is done by subtracting the overall minimum available capacity by the minimum capacity for that disjoint path ((i.e., the minimum capacity for that disjoint path—the overall minimum available capacity).

In block 1308, the SDN controller 210 normalizes each distance by a maximum link capacity. This is done by dividing the distance by the maximum capacity for that disjoint path and multiplying the result by 100. From block 1308 (FIG. 13A), processing continues to block 1310 (FIG. 13B).

In block 1310, the SDN controller 210 generates the WSR value and the WCI value using observations and rewards. In certain embodiments, the SDN controller 210 sends the observations and rewards to the RL agent 220, which generates the WSR value and the WCI value.

In block 1312, the SDN controller 210, for each disjoint path of the plurality of disjoint paths, uses the normalized distance of a disjoint path, the WSR value, and the WCI value, to generate the weight for that disjoint path using the weight model.

In block 1314, the SDN controller 210 sends the weight for each disjoint path to each switch in the network topology.

Figure 14:
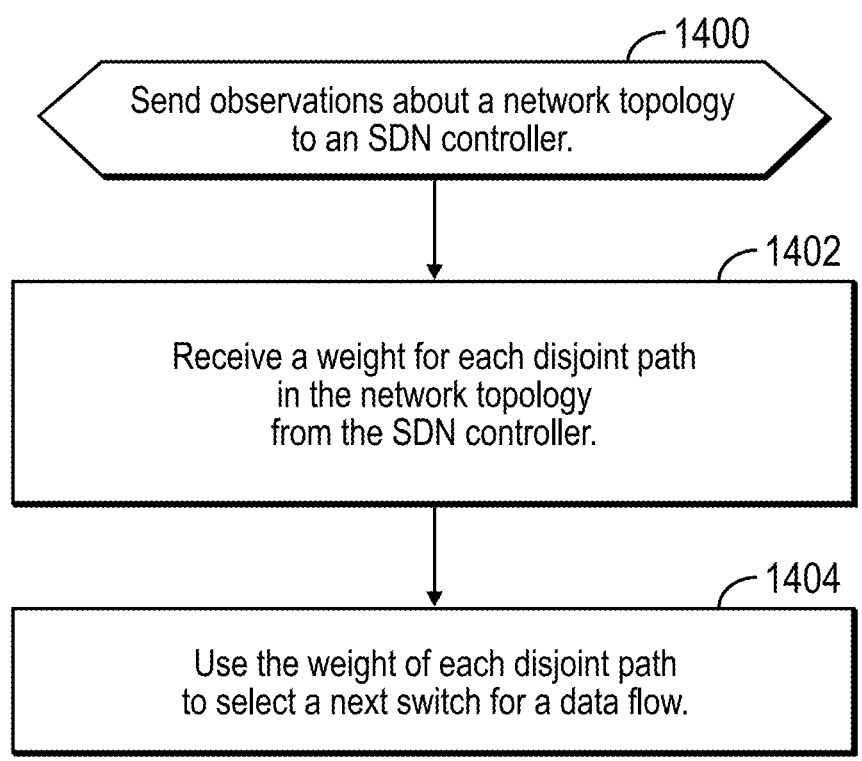
FIG. 14 illustrates, in a flowchart, operations by a switch to select a next switch in accordance with certain embodiments.

FIG. 14 illustrates, in a flowchart, operations by a switch to select a next switch in accordance with certain embodiments. In certain embodiments, the processing of FIG. 14 occurs at each switch of the network topology. Control begins at block 1400 with the switch sending observations about a network topology to the SDN controller 210. This may be done by the SDN controller 210 polling the switch for the observations.

In block 1402, the switch receives a weight for each disjoint path in the network topology from the SDN controller 210. In block 1404, the switch uses the weight of each disjoint path to select a next switch (e.g., a hop switch) for a data flow. In certain embodiments, the weight is applied to each egress port on each switch. A link connects an egress port on a leaf switch to an ingress port on a spine switch.

Figure 15:
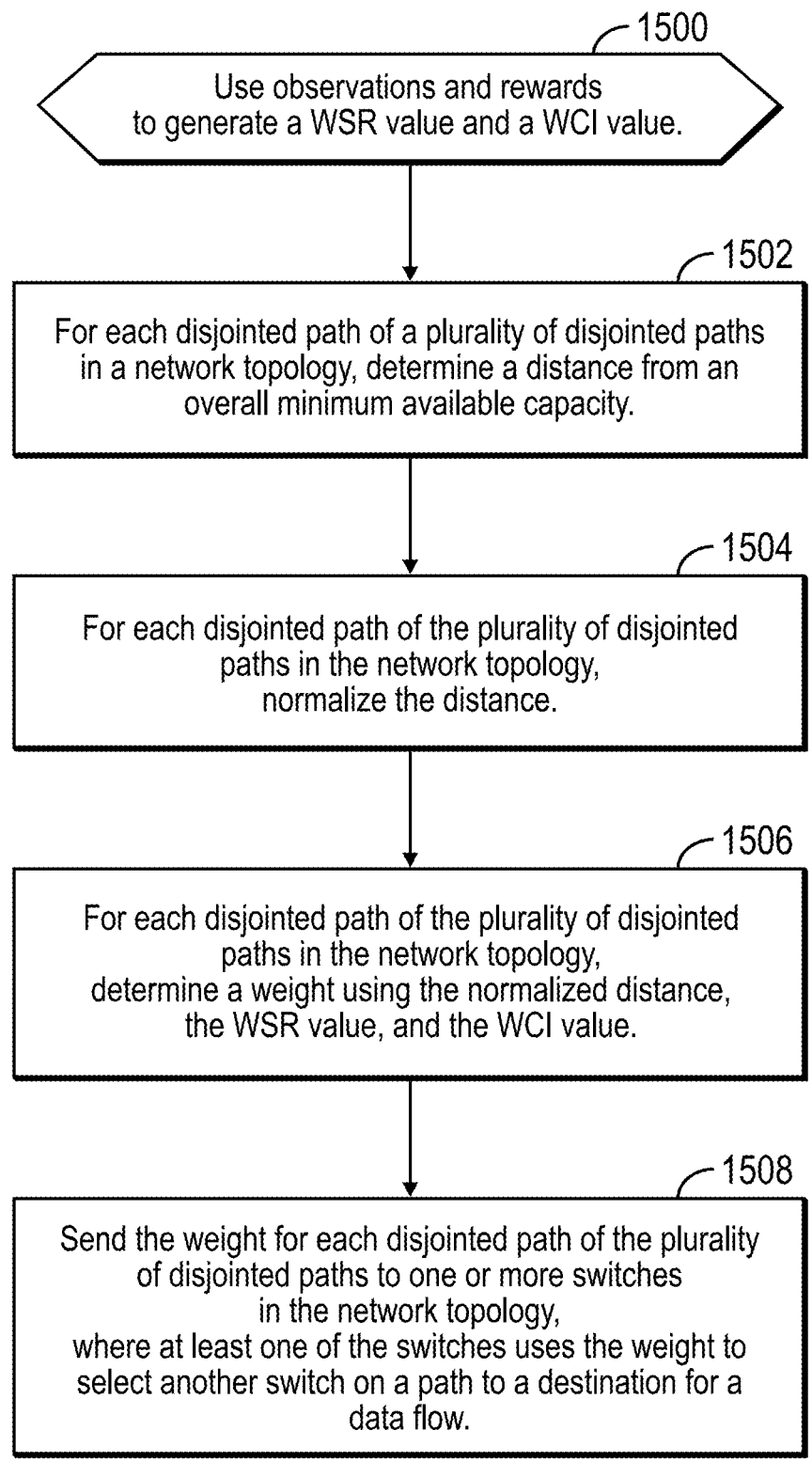
FIG. 15 illustrates, in a flowchart, operations by the SDN controller for the AI-driven WCMP approach in accordance with certain embodiments.

FIG. 15 illustrates, in a flowchart, operations by the SDN controller 210 for the AI-driven WCMP approach in accordance with certain embodiments. Control begins at block 1500 with the SDN controller 210 using observations and rewards to generate a WSR value and a WCI value. In certain embodiments, the SDN controller 210 polls a switch of a network topology to obtain observations about the network topology and determines rewards based on queue occupancy and utilization.

In block 1502, the SDN controller 210, for each disjointed path of a plurality of disjointed paths in a network topology, determines a distance from an overall minimum available capacity. In order to do this, the SDN controller 210, for all disjointed paths, determines the minimum available capacity and then determines the overall minimum available capacity.

In block 1504, the SDN controller 210, for each disjointed path of the plurality of disjointed paths in the network topology, determines the normalized distance. In block 1506, the SDN controller 210, for each disjoint path of the plurality of disjointed paths in the network topology, determines a weight using the normalized distance, the WSR value and the WCI value.

In block 1508, the SDN controller 210 sends the weight for each disjoint path of the plurality of disjointed paths to one or more switches in the network topology, where at least one of the switches uses the weight to select another switch (e.g., a hop switch) on a path to a destination (e.g., a server) for a data flow.

In certain embodiments, the RL agent comprises a machine learning model, and where the machine learning model receives the observations as inputs, calculates the reward, and outputs actions comprising the WSR value and the WCI value.

In certain embodiments, a minimum available capacity is determined for each disjoint path of the plurality of disjoint paths, which results in a plurality of minimum available capacities, and a smallest available capacity of the plurality of minimum available capacities is selected as the overall minimum available capacity.

In certain embodiments, in response to receiving a low reward, the WSR value and the WCI value are re-tuned.

In certain embodiments, the AI-driven WCMP approach improves data flow distribution in a network topology for a data center to improve network performance. The AI-driven WCMP approach includes the SDN controller 210 to track the network topology and available capacity of paths in the network topology. Each switch in the network topology has an out-of-band connection to the SDN controller 210. Each switch detects new data flows and can apply weights (provided by the SDN controller) when selecting a path to a next switch. In certain embodiments, segment routing is used to forward the data flows.

The AI-driven WCMP approach is agnostic to upper layer protocols and to the data center fabric, minimizes hash collisions, provides full bisection, and fosters scalability (with a small observation space and an RL agent to tune two parameters: WSR and WCI).

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program instructions embodied therewith, the program instructions executable by a computer processor to cause the computer processor to perform operations comprising:
    using observations and rewards to generate a Weight Certainty Indicator (WCI) value and a Weight Sensitivity Response (WSR) value;
    for each disjointed path in a plurality of disjointed paths in a network topology,
        determining a distance from an overall minimum available capacity for that disjointed path;
        normalizing the distance; and
        determining a weight for that disjointed path using the normalized distance, the WCI value, the WSR value; and
    sending the weight for each disjointed path of the plurality of disjointed paths to each switch for use in selecting a next switch on a path to a destination.

2. The computer program product of claim 1, wherein the observations comprise hop latency, queue occupancy, egress port utilization, a switch polling interval, and a weight update interval.

3. The computer program product of claim 1, wherein a Reinforcement Learning (RL) agent comprises a machine learning model, and wherein the machine learning model receives the observations and rewards as inputs and outputs actions comprising the WSR value and the WCI value.

4. The computer program product of claim 1, wherein the program instructions are executable by the computer processor to cause the computer processor to perform further operations comprising:
    determining a minimum available capacity for each disjoint path of the plurality of disjoint paths, which results in a plurality of minimum available capacities; and
    selecting a smallest available capacity of the plurality of minimum available capacities as the overall minimum available capacity.

5. The computer program product of claim 1, wherein the program instructions are executable by the computer processor to cause the computer processor to perform further operations comprising:
    generating a first value by dividing the distance from the overall minimum available capacity by a normalizer;
    generating a second value by dividing one by the WSR;
    generating a third value by raising the first value to the power of the second value;
    generating a fourth value by multiplying the WCI by the third value; and
    generating the weight by adding one to the fourth value.

6. The computer program product of claim 1, wherein the program instructions are executable by the computer processor to cause the computer processor to perform further operations comprising:
    maintaining a link table, wherein the link table comprises columns for a link identifier of a link, a maximum capacity of the link, and available capacity of the link; and
    maintaining a weight table, wherein the weight table comprises a source switch, a next hop switch, and a weight.

7. The computer program product of claim 1, wherein the program instructions are executable by the computer processor to cause the computer processor to perform further operations comprising:
    polling each switch of the network topology to obtain the observations; and
    determining the rewards based on queue occupancy and port utilization.

8. A computer system, comprising:
    one or more computer processors, one or more computer-readable memories and one or more computer-readable, tangible storage devices; and
    program instructions, stored on at least one of the one or more computer-readable, tangible storage devices for execution by at least one of the one or more computer processors via at least one of the one or more computer-readable memories, to perform operations comprising:
    using observations and rewards to generate a Weight Certainty Indicator (WCI) value and a Weight Sensitivity Response (WSR) value;
    for each disjointed path in a plurality of disjointed paths in a network topology,
        determining a distance from an overall minimum available capacity for that disjointed path;
        normalizing the distance; and
        determining a weight for that disjointed path using the normalized distance, the WCI value, the WSR value; and
    sending the weight for each disjointed path of the plurality of disjointed paths to each switch for use in selecting a next switch on a path to a destination.

9. The computer system of claim 8, wherein the observations comprise hop latency, queue occupancy, egress port utilization, a switch polling interval, and a weight update interval.

10. The computer system of claim 8, wherein a Reinforcement Learning (RL) agent comprises a machine learning model, and wherein the machine learning model receives the observations and rewards as inputs and outputs actions comprising the WSR value and the WCI value.

11. The computer system of claim 8, wherein the operations further comprise
    determining a minimum available capacity for each disjoint path of the plurality of disjoint paths, which results in a plurality of minimum available capacities; and selecting a smallest available capacity of the plurality of minimum available capacities as the overall minimum available capacity.

12. The computer system of claim 8, wherein the operations further comprise:
generating a first value by dividing the distance from the overall minimum available capacity by a normalizer;
generating a second value by dividing one by the WSR;
generating a third value by raising the first value to the power of the second value;
generating a fourth value by multiplying the WCI by the third value; and
generating the weight by adding one to the fourth value.

13. The computer system of claim 8, wherein the operations further comprise:
maintaining a link table, wherein the link table comprises columns for a link identifier of a link, a maximum capacity of the link, and available capacity of the link; and
maintaining a weight table, wherein the weight table comprises a source switch, a next hop switch, and a weight.

14. The computer system of claim 8, wherein the operations further comprise:
polling each switch of the network topology to obtain the observations; and
determining the rewards based on queue occupancy and port utilization.

15. A computer-implemented method, comprising operations for:
using observations and rewards to generate a Weight Certainty Indicator (WCI) value and a Weight Sensitivity Response (WSR) value;
for each disjointed path in a plurality of disjointed paths in a network topology,
determining a distance from an overall minimum available capacity for that disjointed path;
normalizing the distance; and
determining a weight for that disjointed path using the normalized distance, the WCI value, the WSR value; and
sending the weight for each disjointed path of the plurality of disjointed paths to each switch for use in selecting a next switch on a path to a destination.

16. The computer-implemented method of claim 15, wherein the observations comprise hop latency, queue occupancy, egress port utilization, a switch polling interval, and a weight update interval.

17. The computer-implemented method of claim 15, wherein a Reinforcement Learning (RL) agent comprises a machine learning model, and wherein the machine learning model receives the observations and rewards as inputs and outputs actions comprising the WSR value and the WCI value.

18. The computer-implemented method of claim 15, further comprising operations for:
determining a minimum available capacity for each disjoint path of the plurality of disjoint paths, which results in a plurality of minimum available capacities; and
selecting a smallest available capacity of the plurality of minimum available capacities as the overall minimum available capacity.

19. The computer-implemented method of claim 15, further comprising operations for:
generating a first value by dividing the distance from the overall minimum available capacity by a normalizer;
generating a second value by dividing one by the WSR;
generating a third value by raising the first value to the power of the second value;
generating a fourth value by multiplying the WCI by the third value; and
generating the weight by adding one to the fourth value.

20. The computer-implemented method of claim 15, further comprising operations for:
maintaining a link table, wherein the link table comprises columns for a link identifier of a link, a maximum capacity of the link, and available capacity of the link; and
maintaining a weight table, wherein the weight table comprises a source switch, a next hop switch, and a weight.

* * * * *